United States Patent [19]

Lo et al.

[11] Patent Number: 5,528,033
[45] Date of Patent: Jun. 18, 1996

[54] AUTOMATIC SURFACE PROFILING FOR SUBMICRON DEVICE

[75] Inventors: Jiann-Chang Lo; Timothy J. O'Leary, both of Boca Raton, Fla.

[73] Assignee: International Business Machines Corporation, Armonk, N.Y.

[21] Appl. No.: 413,070

[22] Filed: Mar. 29, 1995

[51] Int. Cl.⁶ .............................. H01J 37/00; H01J 37/26
[52] U.S. Cl. .......................................... 250/307; 250/310
[58] Field of Search .................................. 250/306, 307, 250/310

[56] References Cited

U.S. PATENT DOCUMENTS

| | | |
|---|---|---|
| 4,525,919 | 7/1985 | Fabian . |
| 4,596,036 | 6/1986 | Norgren et al. . |
| 4,693,781 | 9/1987 | Leung et al. . |
| 4,702,795 | 10/1987 | Douglas . |
| 4,729,815 | 3/1988 | Leung . |
| 4,733,074 | 3/1988 | Kato et al. ............................ 250/310 |
| 4,900,940 | 2/1990 | Nakamura . |
| 4,984,039 | 1/1991 | Douglas . |
| 5,019,522 | 5/1991 | Meyer et al. . |
| 5,072,266 | 12/1991 | Bulucea et al. . |
| 5,182,234 | 1/1993 | Meyer . |
| 5,283,442 | 2/1994 | Martin et al. . |
| 5,298,442 | 3/1994 | Bulucea et al. . |
| 5,321,977 | 6/1994 | Clabes et al. ............................ 250/307 |
| 5,347,854 | 9/1995 | Martin et al. ............................ 73/105 |
| 5,400,647 | 3/1995 | Elings ....................................... 73/105 |

OTHER PUBLICATIONS

C. Johnson, Jr. et al., "Method for Making Dimensions in Structures Using Sidewall Image Transfer Techniques", IBM Technical Disclosure Bulletin, vol. 26, No. 9, Feb. 1984, pp. 4587–4589.

*Primary Examiner*—Bruce C. Anderson
*Attorney, Agent, or Firm*—Keith L. Hargrove; Andrew J. Dillon

[57] ABSTRACT

A method for automatically providing a surface profile analysis of a submicron device using a microscope system typically used to measure critical dimensions of the submicron device is disclosed. The method generates a data point array that is linearly interpolated along a particular scan line measured. The system then calculates an angle for performing a rotational correlation then rotates the measurement profile from the scan line to an absolute horizontal position based on this rotational correlation angle. Next, the system separates the scan line into independent subset features having line and trench features. The number of these line and trench features are then determined in the scan line and using the data point array, the system then calculates the height, width, and angle for each subset feature in that scan line.

17 Claims, 7 Drawing Sheets

AUTOMATIC SURFACE PROFILING FOR SUBMICRON DEVICE

BACKGROUND OF THE INVENTION

1. Technical Field

The present invention relates, in general, to a method and apparatus for automatically profiling surfaces and, in particular, to feature measurements to sub-nanometer region using atomic force microscopy. More specifically still, the present invention is directed to surface profile analysis for submicron structures that assesses the height, width, and side wall angle of a device under test.

2. Description of the Related Art

The capability to measure line widths and profile trenches and substrates is becoming more and more important in the field of micro-meterology. Presently, instruments based on optical interaction are inaccurate or have physical limitations when the features to be measured are smaller that a micrometer.

Accurate micro-meterology is typically performed with scanning electron microscopes (SEM). There are several disadvantages to the use of a SEM, such as the need to perform measurements in a vacuum environment and cross sectioning of the substraights where the measurements are performed at only one location of the grove or trench. SEM measurement is a time consuming process and there is a limited spacial accuracy due to the effects resulting from e-beam interaction with the material being measured.

The use of scanning tunneling microscopes to measure forces between a tip and a surface of an insulating material by simply mounting a scanning tunneling microscope tip on a cantilever beam is another system used to perform submicron analysis. The resulting instrument combines the principles of the scanning tunneling microscope and the stylus profilometer.

Next, atomic force microscope mapping and profiling has also been developed. An atomic force microscope is used to provide precise measurements of the force between a tip and a sample over a tip sample distance in the range between approximately 30–50 Angstroms. In a first application, the force signal is used to maintain constant tip-surface spacing for facilitating profiling with a spacial resolution of 50 Angstroms.

In the prior art techniques, the top edges of the trench are detected by first vertically moving the tip toward the top surface of the trench and then scanning the tip horizontally within the trench. The trench measurements are then performed by lowering the tip in the center of the trench. The tip is made to approach horizontally one of the side walls and then the other in order to measure the width at a specific depth location. The depth of the tip in the trench is changed and the two side wall approach technique is repeated. At each depth location, two measurements are performed, as the tip approaches the first and the second side wall, which is time consuming. Moreover, a complex dual optical sensor is required for first performing the vertical and then the horizontal approaches.

In prior apparatus, the tip is vibrated in the horizontal direction as well as the conventional vertical direction, possibly at difference frequencies, in order to sense the horizontal and vertical components of the force gradient. A serious limitation of such an arrangement is the need to measure the horizontal vibration. However, by using a second interferometer with its light beam focused on the light beam of the cantilever supporting the tip, the horizontal vibration may be measured. Such an arrangement significantly increases the complexity of the apparatus.

With the vibration of the tip, a certain level of noise is introduced into the measurement signal inadvertently. Additionally, the systems must be manually operated by a user to profile each trench one by one to complete the analysis.

Accordingly, what is needed is a system and method for profiling submicron structures that greatly minimizes spurious noise in the measurement signals while also allowing automatic profiling of many trenches on a surface, rather that manually profiling one trench at a time.

SUMMARY OF THE INVENTION

It is therefore one object of the present invention to provide a method and apparatus for automatically profiling surfaces.

It is another object of the present invention to feature measurements to sub-nanometer region using atomic force microscopy.

It is yet another object of the present invention to provide a surface profile analysis for submicron structures that assesses the height, width, and side wall angle of a device under test.

The foregoing objects are achieved as is now described.

According to the present invention, a method for automatically providing a surface profile analysis of a submicron device using a microscope system typically used to measure critical dimensions of the submicron device is disclosed. The method generates a data point array that is linearly interpolated along a particular scan line measured. The system then calculates an angle for performing a rotational correlation and then rotates the measurement profile from the scan line to an absolute horizontal position based on this rotational correlation angle. Next, the system separates the scan line into independent subset features having line and trench features. The number of these line and trench features are then determined in the scan line. Using the data point array, the system then calculates the height, width, and angle for each subset feature in that scan line.

To measure the height of each feature, the system selects a threshold value and then determines a selected profile for that subset. Based on this profile, all data points are correlated within the threshold of the subset. Next, the system generates an average value of the top to bottom sections using these data points and then generates a height value based upon the distance between the average top and average bottom value within the subset.

Likewise, to calculate the width of a particular feature in a subset, the system selects a location within the subset for calculating the width, collects data points on at least a first and second side wall adjacent the selected location, calculates an average of the data points on a first side wall and a second side wall adjacent the location and then established the width as the distance between that first side wall and the second side wall.

The side wall angle for a particular feature is also calculated. This is accomplished by selecting a percentage threshold from a top and bottom corner point or points of a selected side wall within that subset. Next, a least square fit is performed on the selected data points within that threshold. Finally, the side wall angle value is corrected based upon whether the side wall is a top to bottom or bottom to top side wall.

When calculating either the height, width, or angle of each subset feature in a scan line, the system first determines all top, middle, and bottom locations along that subset feature and then determines whether any of the top and bottom point locations are true top and bottom point locations. These corner point locations are also calculated by searching the minimum and maximum points in a rotated subset.

In an alternative approach, the system generates an array based on data points taken while measuring the submicron device. These data points are then interpolated into that array. A second array is generated for a histogram using these interpolated data points. Next, a correction angle of measurement is then calculated and the measurement profile is rotating corresponding the to absolute horizontal position based upon this correction angle. The system then separates the scan lines into independent subset features for analysis and selects minimum and maximum points within the rotated subset for locating corner points of the subset feature. These minimum and maximum points are then determined to be top and bottom point locations and whether these top and bottom point locations are true top and bottom point locations. From these true top and bottom point locations, all horizontal segments are calculated or determined as well as the width and angle of the subset features. Once the results have been accumulated, the scan line analysis is completed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Scanning force microscopes are described in U.S. Pat. No. 5,283,442, issued to Martin, et al. and assigned to the same assignee as the present application, which patent is incorporated herein by reference.

Figure 1:
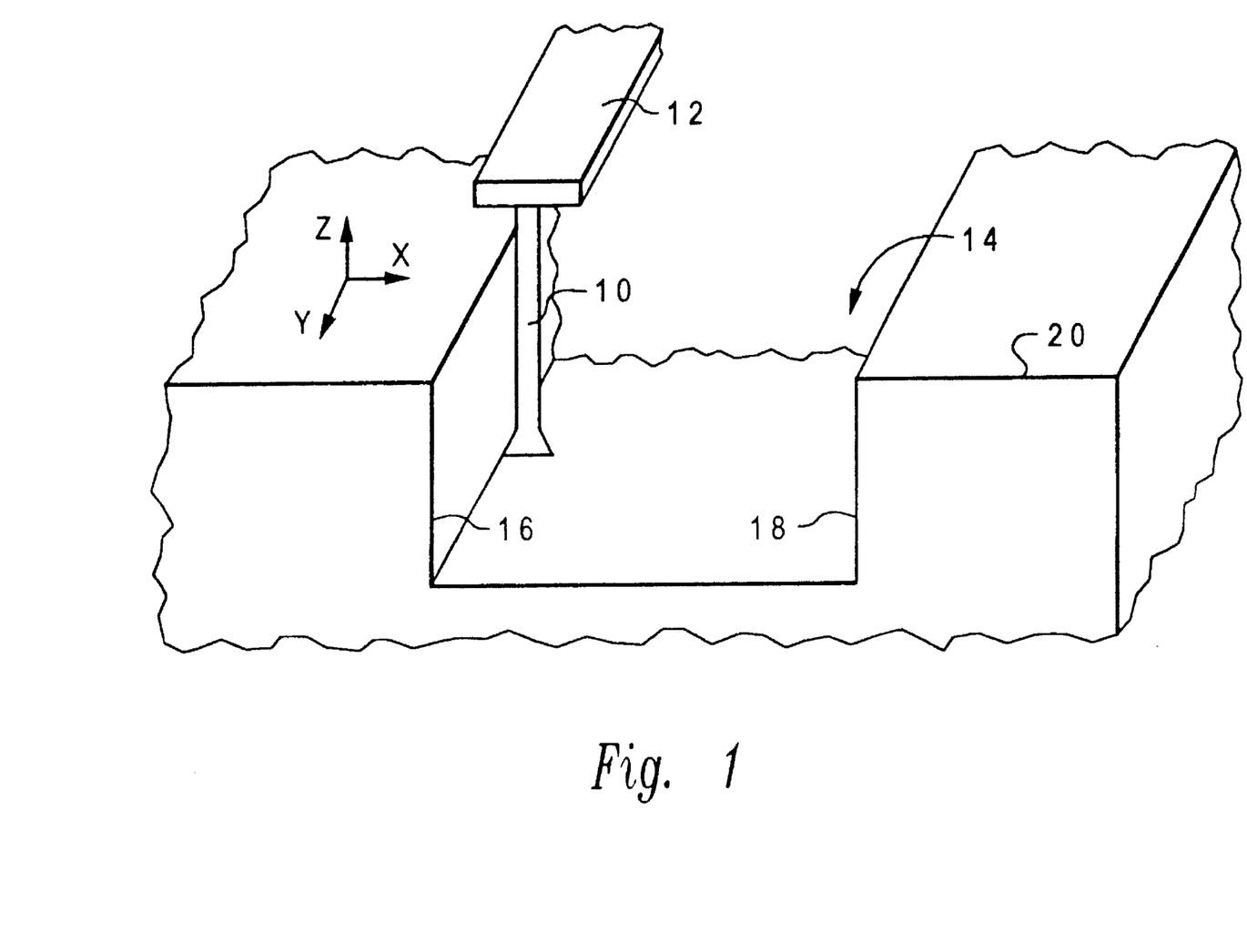
FIG. 1 depicts in accordance with a preferred embodiment of the present invention a representation of a tip 10 of a scanning force microscope disposed within a trench located in a substrate 20.

Referring now to the figures and to FIG. 1 in particular, there is shown a representation (not drawn to scale), of a tip 10 coupled to a cantilever 12 of a scanning force microscope which tip is disposed within a trench 14 located in a substrate 20, the sidewalls 16 and 18 of which are to be profiled. A conventionally shaped tip is inadequate for profiling a structure having a near vertical wall, particularly when the height of the trench is greater that approximately 100 A. It has been determined that improved results are obtained when the tip 10 is in the shape of boot as shown generally in FIG. 1. Tips of boot shape are fabricated using several lithographics steps in a combination of dry and wet etching processes. The precess it stopped before the tip is formed into a sharp pyramidal tip.

Figure 2:
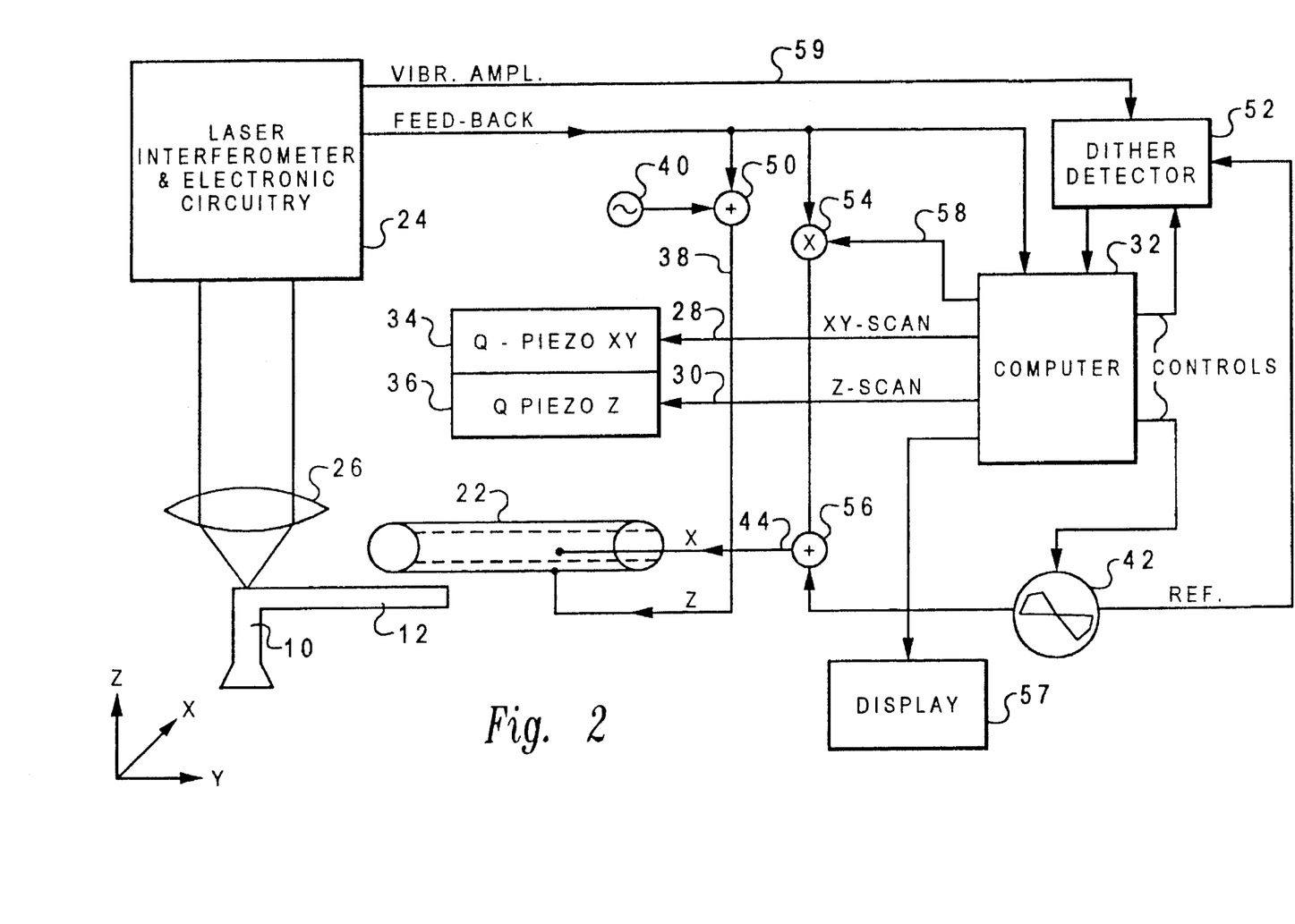
FIG. 2 is a schematic block diagram of a preferred embodiment of an arrangement for controlling the tip position of a scanning force microscope during profiling.

FIG. 2 is a schematic block diagram of a preferred embodiment of an arrangement for controlling the tip position of a scanning force microscope for profiling near vertical structures such as a sidewall of a trench or line in a substrate.

As used herein, the Z-axis direction shall be understood to refer to a direction parallel to the longitudinal axis of the tip 10. The X-axis direction shall be understood to refer to a direction normal to the longitudinal axis of the tip 10.

Cantilever 12 with tip 10 is coupled to a fast X–Z piezoelectric tube scanner 22 for rapidly and accurately controlling the position of tip 10 in both the X-axis direction and the Z-axis direction. Preferably, vibratory motion of tip 10 is measured by laser interferometer and electronic circuitry 24 which causes a laser beam to be transmitted through collimating lens 26 onto the back of the cantilever 12 which receives the beam reflected from the cantilever 12 which reflected beam travels back through lens 26 to detector in laser interferometer and electronics circuitry are described, for example, in the article by Martin, et al. supra. The laser interferometer and electronic circuitry 24 accurately detects the vibratory motion of cantilever 12 and hence the tip 10 and provides output signals commensurate with the motion of the tip 10 for controlling the scan track of the tip 10 as will be described hereinafter.

The position of the tip 10 is scanned in the XY-plane and in the Z-axis direction, where the XY-plane is a plane parallel to the top surface of the substrate 20 and where the Z-axis is in the depth or vertical direction (as shown) of the trench or line, responsive to scan signals provided along respective conductors 28 and 30 from computer 32 to Q-piezoelectrics 34 for X-axis and Y-axis displacements (xy-plane displacement) and Q-piezoelectric 36 for Z-axis displacement.

In addition to the scan motion provided in response to scan signals from computer 32 along conductors 28 and 30, the tip 10 is vibrated in the Z-axis direction at a high frequency, typically at the resonance frequency of 300 khz, by virtue of a signal from a high frequency oscillator 40 provided along conductor 38 to piezoelectric tube scanner 22.

The tip 10 is also made to undergo dither motion about its nominal position in the X-axis direction (the trench width direction) at a lower frequency that the Z-axis direction dither. The X-axis direction dither is preferably at an amplitude of approximately 10 A at a frequency of 3 khz. The X-axis direction dither motion is provided by virtue of a signal from oscillator 42 along conductor 44 to the piezoelectric tube scanner 22.

The top is coupled to a X–Z piezoelectric tube scanner 22 for faster position control. However, the scanner provides only a relatively limited range of motion, approximately one micron. Therefore, the scanner itself is coupled to a long range, but slower responding, scanner (not shown). The long range scanner is controlled by Q-piezoelectrics 34 and Q-piezoelectric 36. The tube scanner 22 is controlled by the signals provided along conductors 38 and 44.

Figure 3:
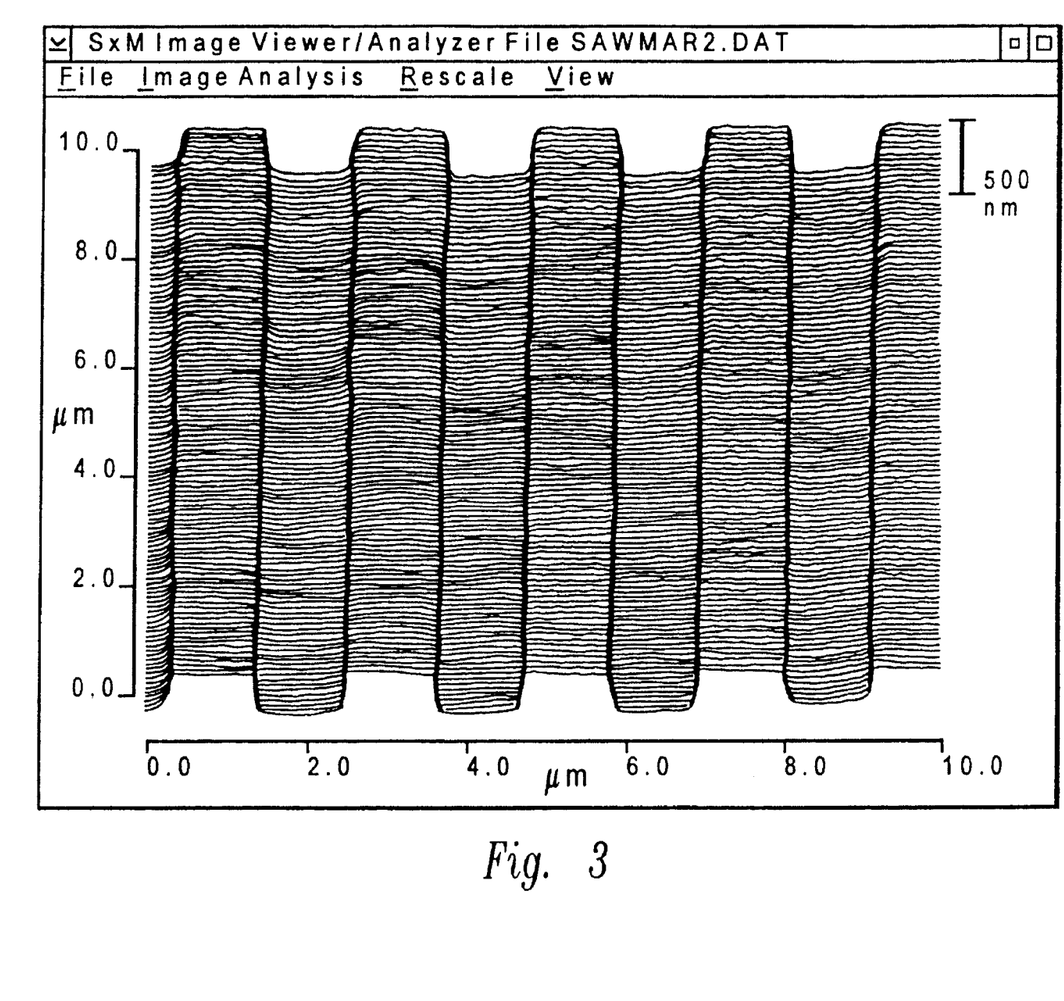
FIG. 3 depicts a readout of an example of parallel photoresist lines profiled according to the present invention.

The invention provides a novel system and method to analyze the line width and height of an arbitrary number of continuous trench features in an automatic fashion. The system is able to rotate the measurement data back to the horizontal position automatically, if the test samples have been tilted accidently during the test, and report the rotated angle back to the user as desired. Furthermore, the system is able to calculate the number of trenches and locate the trench positions automatically. Using this information, the system can calculate the height, width, and sidewall angle of each trench. FIG. 3 illustrates a readout of an example of parallel photoresist lines profiled according to the present invention. The scan line profile was generated using the method in the flow diagram of FIG. 4.

Figure 4:
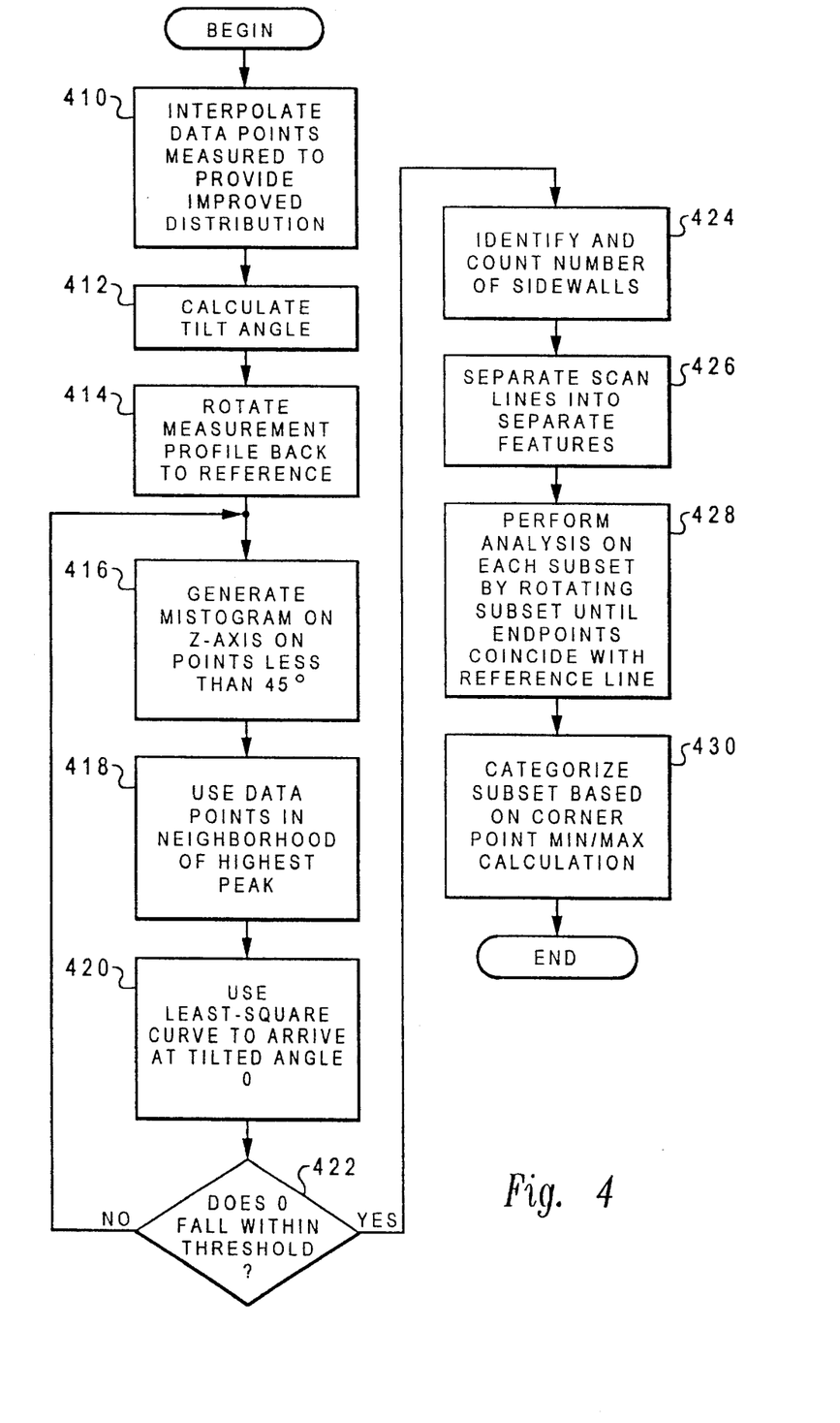
FIG. 4 is a flow diagram of a method for profiling the critical dimensions of an ultrasmall structure or device having features in the sub-nanometer region.

FIG. 4 illustrates a flow diagram of a method for profiling the critical dimensions of a ultrasmall structure or device having features in the sub-nanometer region. The method generates a profile one scan line at a time and the method discussed is directed towards what occurs during one scan line. Many scan line profiles are generated to arrive at the profile shown in FIG. 3. In step 410, the system interpolates data points measured to provide an improved distribution. A data point array is generated and is linearly interpolated along the scan line. In step 412, the system automatically calculates the tilted angle of the measurement. In step 414, the system rotates the measurement profile back to the absolute horizontal position. The angle calculation and rotational correlation are achieved according to steps 418–424.

In step 416, the system performs a histogram on the vertical axis (Z-axis) on those points whose slope with respect to the next point is less than 45°. In step 418, the system includes data points in the neighborhood of the highest peak of the Z histogram. In step 420, the system performs the least square curb fitting to the included data point so as to calculate the tilted angle θ. In step 422, the system determines whether θ falls within a specified threshold, such as for example, θ is 30% greater than the last tilted angle, before returning to step 414 to repeat the process.

Figure 5:
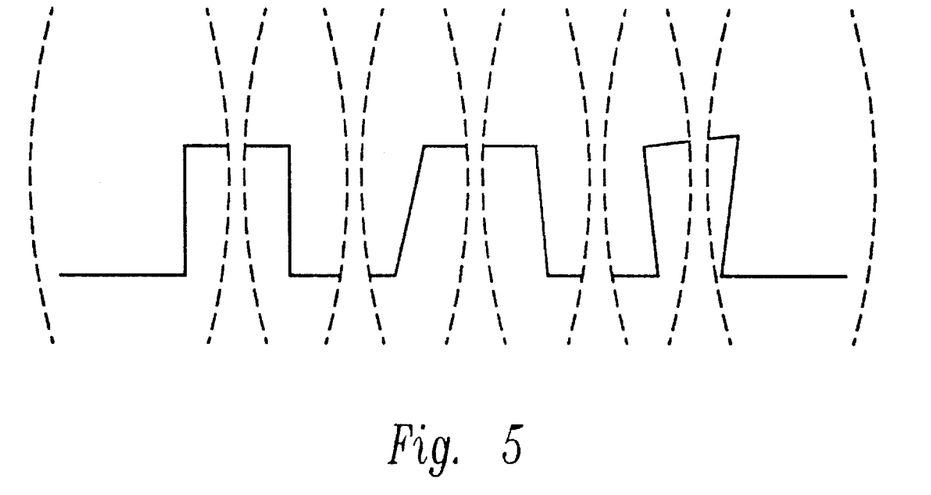
FIG. 5 is an example of subset branches.
Figure 6A:
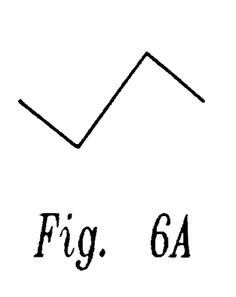
FIG. 6A –F is the analysis subset categorized into three different types.
Figure 6B:
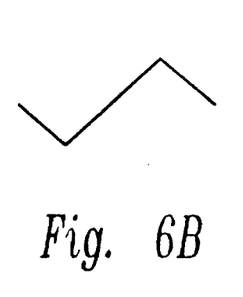
Figure 6C:
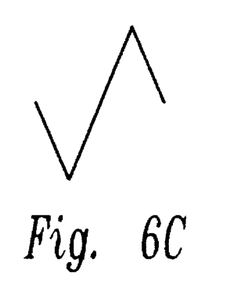
Figure 6D:
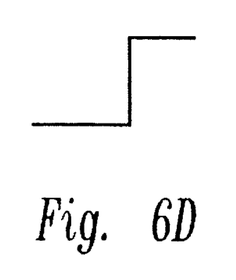
Figure 6E:
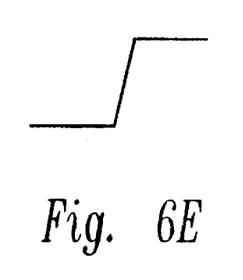
Figure 6F:
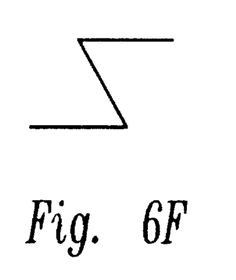

In order to simplify the process of measuring or performing the profile analysis, the method separates the scan line into independent features by forming subsets. Thus, in step 424, the system draws imaginary lines across the sidewall so that the location and number of sidewalls are identified and counted. Next, in step 426, the system separates the scan line into independent features using the center points between each pair of sidewalls as the end points of an analysis subset. FIG. 5 illustrates an example of subset branches.

At step 428, the system begins an analysis of each subset by rotating it in such a way that the endpoints of the analysis subset coincide with an arbitrary horizontal line. The analysis subset is then categorized into three different types as shown in FIG. 6. The types 6D and 6F illustrated in FIG. 6 are not mathematical functions before rotating; however, using the combination of subset and rotating concepts proposed above, all the features allow the system to analyze the minimum and maximum points in the rotated subset. Type 6A represents a substantially vertical sidewall while type 6B represents a sidewall slightly past vertical and type 6C represents a sidewall short of vertical, or under cut. Each of the three cases is calculated in step 430 by determining the corner points of the features. The corner points are determined by calculating the minimum and maximum points in the rotated analysis subset.

Finally, the corner points are used to identify appropriate subgroups in FIG. 6. The corner points are also used to calculate height, width, and sidewall angles according to parameters chosen by the user in step 432. The results of the calculations are then reported by the system in step 434. Methods for determining height, width, and size wall angles are illustrated in FIGS. 7, 8, and 9 respectively.

Figure 7:
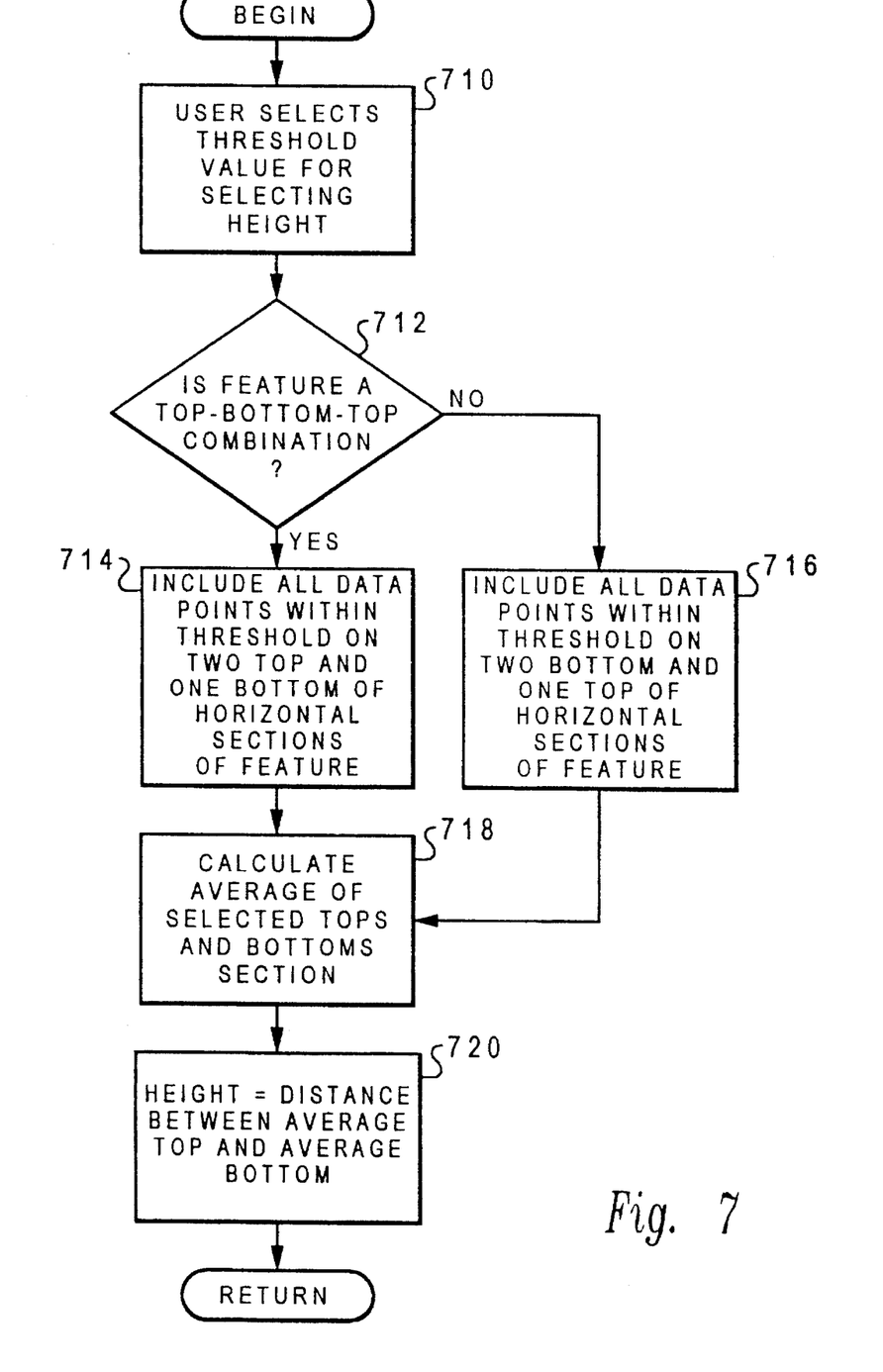
FIG. 7 depicts a block diagram of a method for determining the height using the corner points determined in FIG. 4.

FIG. 7 depicts a block diagram of a method for determining the height using the corner points determined in FIG. 4. In step 710, the user establishes a threshold of 80% of the horizontal segment. Next, in step 712, the system determines if the particular threshold combination is a top-bottom-top combination and if so proceeds to step 714, otherwise it proceeds to step 716. In step 714, the system includes all the data points inside the threshold on two top and one bottom horizontal sections. If the combination in step 712 is different, then in step 716, the system includes all the data points inside the threshold on two bottom and one top horizontal sections. In either case, the system proceeds to step 718, where the system calculates the average of the top and bottom sections, respectively. In step 720, the system calculates the height as being the distance between the average top and the average bottom distance.

Figure 8:
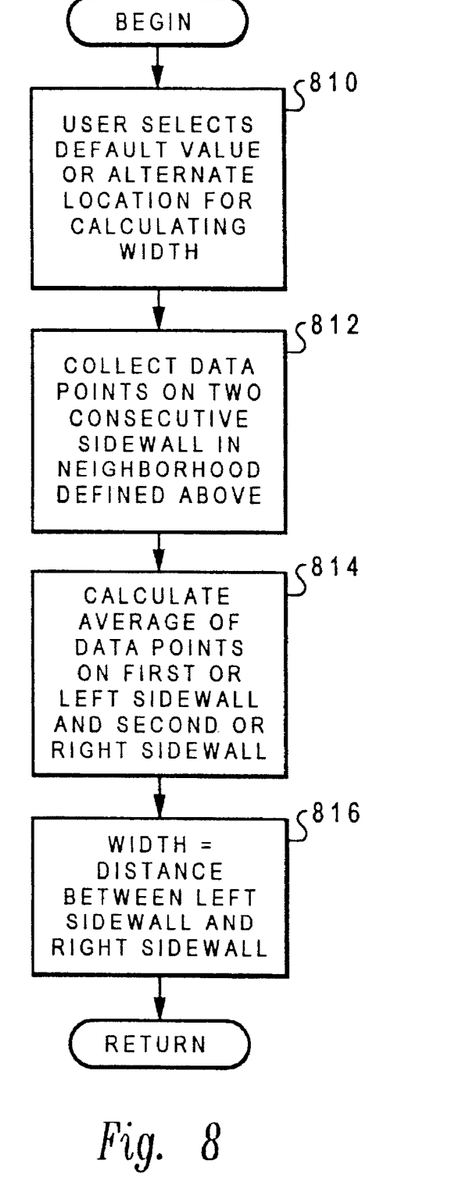
FIG. 8 depicts a method for calculating the width of a particular set of features in a submicron device.

In FIG. 8, a method is depicted for calculating the width of a particular set of features in a submicron device. In step 810, the user elects either to use a default value, based on a user supplied parameter or choose the location where the width is to be calculated on the device to be measured. Next, in step 812, the system collects data points on two consecutive side walls in a selected neighborhood defined in step 810. Next, in step 814, the system calculates a numerical average of the data on the left and side walls, respectively. In step 186, the system determines that the width is equal to the distance between the left side wall and the right side wall. Afterwards, the system returns to the main program.

Figure 9:
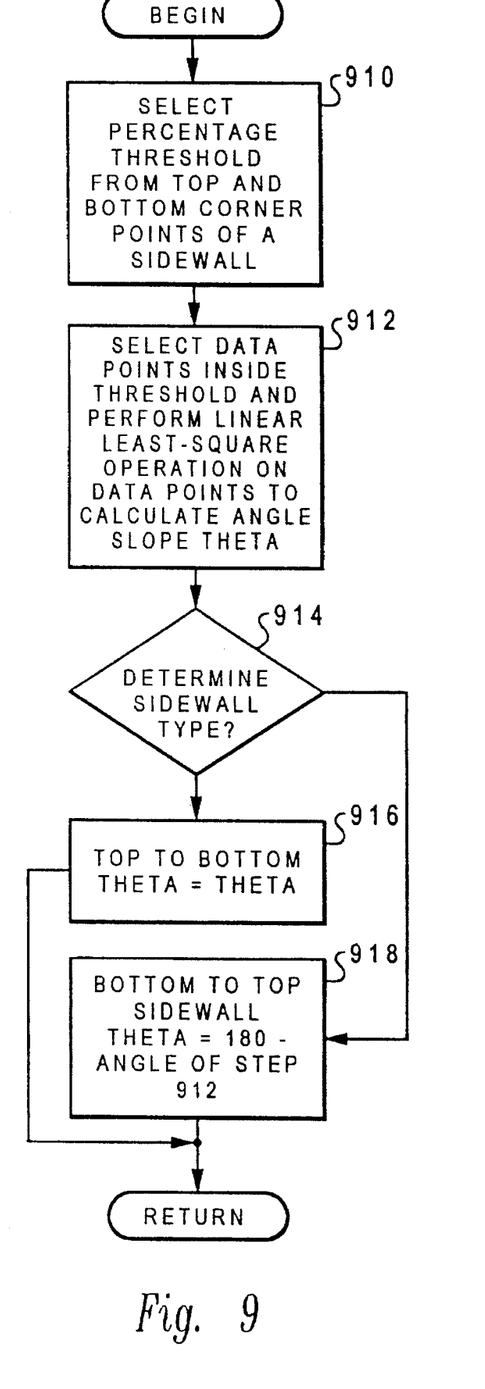
FIG. 9 depicts a block diagram of a method for calculating side wall angles.

FIG. 9 depicts a block diagram of a method for calculating side wall angles. In step 910, the user selects a percentage threshold from the top and bottom corner points of a side wall. The threshold value is determined typically by considering the user supplied parameter. Based upon this threshold in step 912, the system uses data points inside the threshold to execute a linear least square routine to calculate slop angle θ. In step 914, the system determines that this is top to bottom side wall and if so calculates the angle to the θ in step 916, otherwise, θ is equal to 180°—the previous θ.

Although the present invention has been described with respect to an example of using an atomic force microscope, other applications are possible. For example, any type of measuring instrument that can produce two dimensional profiles, such as, for example a scanning electron microscope or an atomic force microscope. It is further understood by those skilled in the art that various changes in form and detail may be made therein without departing from the spirit and scope of the invention.

We claim:

1. In a microscope system used to measure critical dimensions of a submicron device, a method for automatically providing a surface profile analysis for said submicron device comprising the steps of:

generating a data point array, which is linearly interpolated along a scan line;

calculating an angle for performing rotational correlation;

rotating a measurement profile from said scan line to an absolute horizontal position based on said rotational correlation angle;

separating said scan line into independent subset features having line and trench features;

determining the number of line features and trench features in said scan line; and using said data point array, calculating the height, width, and angle for each subset feature in said scan line.

2. The method according to claim 1 wherein said step of calculating said height further comprises the steps of:

determining a selected first profile of said subset;

based on said first profile, correlating all data points within said threshold on said subsets;

generating an average value of top and bottom sections using said data points; and generating a height value based upon a distance between an average top and average bottom value within said subset.

3. The method according to claim 1 wherein said step of calculating said width comprises the steps of:

selecting a location within said subsets for calculating said width;

collecting data points on at least a first and second side wall adjacent said selected location;

calculating an average of said data points on said first side wall and said second wide wall adjacent said location; and establishing said width as the distance between said first side wall and said second side wall.

4. The method according the claim 1 wherein said step of calculating said side wall angle further comprises the steps of:

selecting a percentage threshold from a top and bottom corner points of a selected side wall with said subsets;

performing a least square fit on selected data points within said threshold.

5. The method according to claim 4 further comprising the step of wherein said step of calculating said sidewall angle further comprises the step of:

correcting said sidewall angle value based upon whether said side wall is a top to bottom or bottom to top side wall.

6. The method according to claim 1 wherein said step of calculating the height, width, and angle for each subset feature in said scan line further comprises the steps of:

determining all top, middle, and bottom locations along said subset feature; and determining whether any of said top and bottom point locations are true top and bottom point locations.

7. The method according to claim 1 wherein said step of rotating a measurement profile further comprises the step of:

searching minimum and maximum points in a rotated subset for determining corner points for a feature within said subset.

8. The method according the claim 1 further comprising the step of generating an output array based upon the results for output.

9. The method according the claim 1 wherein said microscope system is an atomic force microscope.

10. The method according to claim 1 wherein said microscope system is a scanning electron microscope.

11. A method for automatically providing a surface profile analysis of a submicron device using a microscope system used to measure critical dimensions of said submicron device, the method of comprising the steps of:

generating an array based on data points taken while measuring said submicron device;

interpolating said data points in said array;

generating a second array for a histogram using said interpolated data points;

automatically calculating a correction angle of measurement;

rotating said measurement profile to an absolute horizontal position;

separating said scan line into independent subset features for analysis;

based upon said rotational correction, searching minimum and maximum points within a rotated subset for locating corner points of said subset feature;

determining whether any of said minimum and maximum points are top and bottom point locations;

determining whether any of said top and bottom point locations are true top and bottom point locations;

determining any horizontal segments based upon said true top and bottom point locations;

using said top and bottom point locations to calculate the height, width, and angle for said subset features; and accumulating the results of said subset feature analysis for calculating said scan line analysis.

12. The method according to claim 11 wherein said step of calculating said height further comprises the steps of:

selecting a threshold value;

determining a selected profile of said subset; 'based on a first profile, correlating all data points within said threshold on said subsets;

generating an average value of top and bottom sections using said data points; and generating a height value based upon a distance between an average top and average bottom value within said subset.

13. The method according to claim 11 wherein said step of calculating said width comprises the steps of:

selecting a location within said subsets for calculating said width;

collecting data points on at least a first and second side wall adjacent said selected location;

calculating an average of said data points on a first side wall and a second wide wall adjacent said location; and establishing said width as the distance between said first side wall and said second side wall.

14. The method according the claim 11 wherein said step of calculating said side wall angle further comprises the steps of:

selecting a percentage threshold from a top and bottom corner points of a selected side wall with said subsets;

performing a least square fit on selected data points within said threshold.

15. The method according to claim 14 further comprising the step of wherein said step of calculating said sidewall angle further comprises the step of:

correcting said sidewall angle value based upon whether said side wall is a top to bottom or bottom to top side wall.

16. The method according the claim 11 wherein said microscope system is an atomic force microscope.

17. The method according to claim 11 wherein said microscope system is a scanning electron microscope.

* * * * *

UNITED STATES PATENT AND TRADEMARK OFFICE
CERTIFICATE OF CORRECTION

PATENT NO. : 5,528,033
DATED : June 18, 1996
INVENTOR(S) : Lo et al.

It is certified that error appears in the above-indentified patent and that said Letters Patent is hereby corrected as shown below:

Column 8, line 29: delete " 'based on a"

Column 8, line 30: insert --based on a-- before "first"

Signed and Sealed this

Third Day of December, 1996

Attest:

BRUCE LEHMAN

*Attesting Officer*          *Commissioner of Patents and Trademarks*